(12) United States Patent
Kohno et al.

(10) Patent No.: US 9,383,240 B2
(45) Date of Patent: *Jul. 5, 2016

(54) AIR FLOW MEASURING DEVICE

(75) Inventors: Yasushi Kohno, Obu (JP); Takao Ban, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 941 days.

This patent is subject to a terminal disclaimer.

(21) Appl. No.: 13/615,792

(22) Filed: Sep. 14, 2012

(65) Prior Publication Data

US 2013/0105137 A1 May 2, 2013

(30) Foreign Application Priority Data

Oct. 31, 2011 (JP) ................................. 2011-238924

(51) Int. Cl.
*G01M 15/04* (2006.01)
*G01F 1/684* (2006.01)
*G01F 1/698* (2006.01)
*G01F 5/00* (2006.01)

(52) U.S. Cl.
CPC ............ *G01F 1/6845* (2013.01); *G01F 1/6983* (2013.01); *G01F 5/00* (2013.01)

(58) Field of Classification Search
CPC ....... G01F 1/6983; G01F 1/6845; G01F 5/00; F02D 41/187; F02B 77/04
USPC ...................................................... 73/114.34
See application file for complete search history.

(56) References Cited

U.S. PATENT DOCUMENTS

| 4,373,383 | A | * | 2/1983 | Plapp | F02D 41/187 73/114.34 |
| 4,505,248 | A | * | 3/1985 | Yuzawa | F02D 41/187 123/488 |
| 4,579,098 | A | * | 4/1986 | Mattes | F02D 41/187 123/494 |
| 4,669,306 | A | * | 6/1987 | Akiyama | G01F 1/6986 73/114.34 |
| 4,741,313 | A | * | 5/1988 | Shimomura | G01F 1/6983 123/494 |
| 4,756,185 | A | * | 7/1988 | Shimomura | G01F 1/6983 73/114.34 |
| 4,771,632 | A | * | 9/1988 | Kubo | F02D 41/187 73/114.34 |

(Continued)

FOREIGN PATENT DOCUMENTS

JP 57-135972 8/1982
JP 1-169323 7/1989

(Continued)

OTHER PUBLICATIONS

Office Action (2 pages) dated Oct. 8, 2013, issued in corresponding Japanese Application No. 2011-238924 and English translation (2 pages).

*Primary Examiner* — Freddie Kirkland, III
(74) *Attorney, Agent, or Firm* — Nixon & Vanderhye P.C.

(57) ABSTRACT

A thermal-type air flow measuring device includes a heat generation heater and a sensor circuit. The heat generation heater is configured to heat a part of intake air drawn into an engine by heat generation upon energization of the heat generation heater. The sensor circuit is configured to at least control the energization of the heat generation heater and to make temperature of the heat generation heater higher than temperature of the heat generation heater at time of the measurement of the flow rate of air when an external signal is inputted into the sensor circuit from outside of the device.

11 Claims, 6 Drawing Sheets

(56) References Cited

U.S. PATENT DOCUMENTS

| | | | | |
|---|---|---|---|---|
| 4,846,133 | A * | 7/1989 | Shiraishi | F02B 77/04 |
| | | | | 123/494 |
| 4,887,462 | A * | 12/1989 | Gneiss | F02D 41/187 |
| | | | | 73/114.34 |
| 6,782,744 | B1 | 8/2004 | Tashiro et al. | |
| 6,964,710 | B2 * | 11/2005 | Hecht | G01F 1/6986 |
| | | | | 134/16 |
| 7,739,908 | B2 * | 6/2010 | Wienand | G01F 1/6845 |
| | | | | 73/204.26 |
| 7,878,056 | B2 * | 2/2011 | Huang | G01F 1/6845 |
| | | | | 73/204.26 |
| 8,215,160 | B2 * | 7/2012 | Saito | F02D 41/187 |
| | | | | 73/114.34 |
| 8,695,409 | B2 * | 4/2014 | Kohno | G01F 1/6842 |
| | | | | 73/114.32 |
| 2004/0007245 | A1 * | 1/2004 | Hecht | G01F 1/6986 |
| | | | | 134/1 |
| 2006/0144138 | A1 | 7/2006 | Yamada et al. | |
| 2009/0282909 | A1 * | 11/2009 | Wienand | G01F 1/684 |
| | | | | 73/204.26 |
| 2011/0072894 | A1 * | 3/2011 | Saito | F02D 41/187 |
| | | | | 73/114.34 |
| 2013/0055801 | A1 * | 3/2013 | Kohno | G01F 1/6842 |
| | | | | 73/114.34 |
| 2013/0105137 | A1 * | 5/2013 | Kohno | G01F 1/6845 |
| | | | | 165/287 |

FOREIGN PATENT DOCUMENTS

| | | |
|---|---|---|
| JP | 04-048221 | 2/1992 |
| JP | H4-147016 | 5/1992 |
| JP | 2008-249635 | 10/2008 |

* cited by examiner

AIR FLOW MEASURING DEVICE

CROSS REFERENCE TO RELATED APPLICATION

This application is based on Japanese Patent Application No 2011-238924 filed on Oct. 31, 2011, the disclosure of which is incorporated herein by reference.

TECHNICAL FIELD

The present disclosure relates generally to an air flow measuring device that measures a flow rate of air suctioned into an engine (internal combustion engine which generates rotative power through combustion of fuel). In particular, the present disclosure relates to a heat cleaning (burning off) technology that removes foreign substances by making a heat generation heater higher than a normal temperature (temperature at the time of flow measurement).

BACKGROUND

As conventional technologies for the air flow measuring device that can perform the heat cleaning, JP-A-SHO56-014116 (corresponding to U.S. Pat. No. 4,373,383), and JP-A-H04-147016 will be described. An air flow measuring device described in JP-A-SHO56-014116 carries out heat cleaning upon input of an external signal (indication signal) for a heat cleaning start when the engine is stopped from a trigger circuit disposed outside this air flow measuring device.

The air flow measuring device in JP-A-SHO56-014116 performs heat cleaning only at the time of the engine stop, and cannot carry out heat cleaning until the engine stops even though the heat cleaning is required when the engine is in operation. The air flow measuring device of JP-A-SHO56-014116 requires a "dedicated harness connecting the trigger circuit and the air flow measuring device" and a "dedicated terminal for inputting the signal from the trigger circuit" as a means for inputting the signal from the trigger circuit. The air flow measuring device of JP-A-SHO56-014116 requires a bridge configuration different from normal operation (flow measurement) as a means for implementing the heat cleaning. For this reason, the cost for performing the heat cleaning will increase.

An air flow measuring device described in JP-A-H04-147016 carries out heat cleaning upon input of an external signal (indication signal) for the heat cleaning start when the engine is stopped from an engine control unit (ECU) disposed outside this air flow measuring device.

Similar to JP-A-SHO56-014116, the air flow measuring device in JP-A-H04-147016 performs heat cleaning only at the time of the engine stop. The air flow measuring device in JP-A-H04-147016 cannot carry out heat cleaning until the engine stops even though the heat cleaning is required when the engine is in operation. Similar to JP-A-SHO56-014116, the air flow measuring device of JP-A-H04-147016 requires a "dedicated harness connecting the ECU and the air flow measuring device" and a "dedicated terminal for inputting the signal from the ECU" as a means for inputting the signal from the ECU. The air flow measuring device of JP-A-H04-147016 requires a heating resistor exclusively for the heat cleaning separately from a heat generation heater for flow measurement. For this reason, a sensor configuration in a flow measuring region becomes complicated.

SUMMARY

According to the present disclosure, there is provided a thermal-type air flow measuring device for measuring a flow rate of air. The device includes a heat generation heater and a sensor circuit. The heat generation heater is configured to heat a part of intake air drawn into an engine by heat generation upon energization of the heat generation heater. The sensor circuit is configured to at least control the energization of the heat generation heater and to make temperature of the heat generation heater higher than temperature of the heat generation heater at time of the measurement of the flow rate of air when an external signal is inputted into the sensor circuit from outside of the device.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

An air flow measuring device 1 is a thermal type air flow meter (AFM), and includes a heat generation heater 2 that heats a part of intake air suctioned into an engine as a result of heat generation by its energization, and a sensor circuit 3 that controls at least the energization of the heat generation heater 2. The sensor circuit 3 includes a heat cleaning device 5 that makes higher the temperature of the heat generation heater 2 than the temperature at the time of measurement of the air flow rate when an external signal (signal that provides a direction to start heat cleaning) is inputted from an ECU 4 disposed outside the air flow measuring device 1. The heat cleaning device 5 may be a control program, or may be a device configured as an electric circuit (such as a logic circuit not using a computer) that performs a sequence control.

Specific examples (embodiments) will be described below in reference to the accompanying drawings. The embodiment discloses a concrete example, and needless to say, the disclosure is not limited to the embodiment.

First Embodiment

Figure 1:
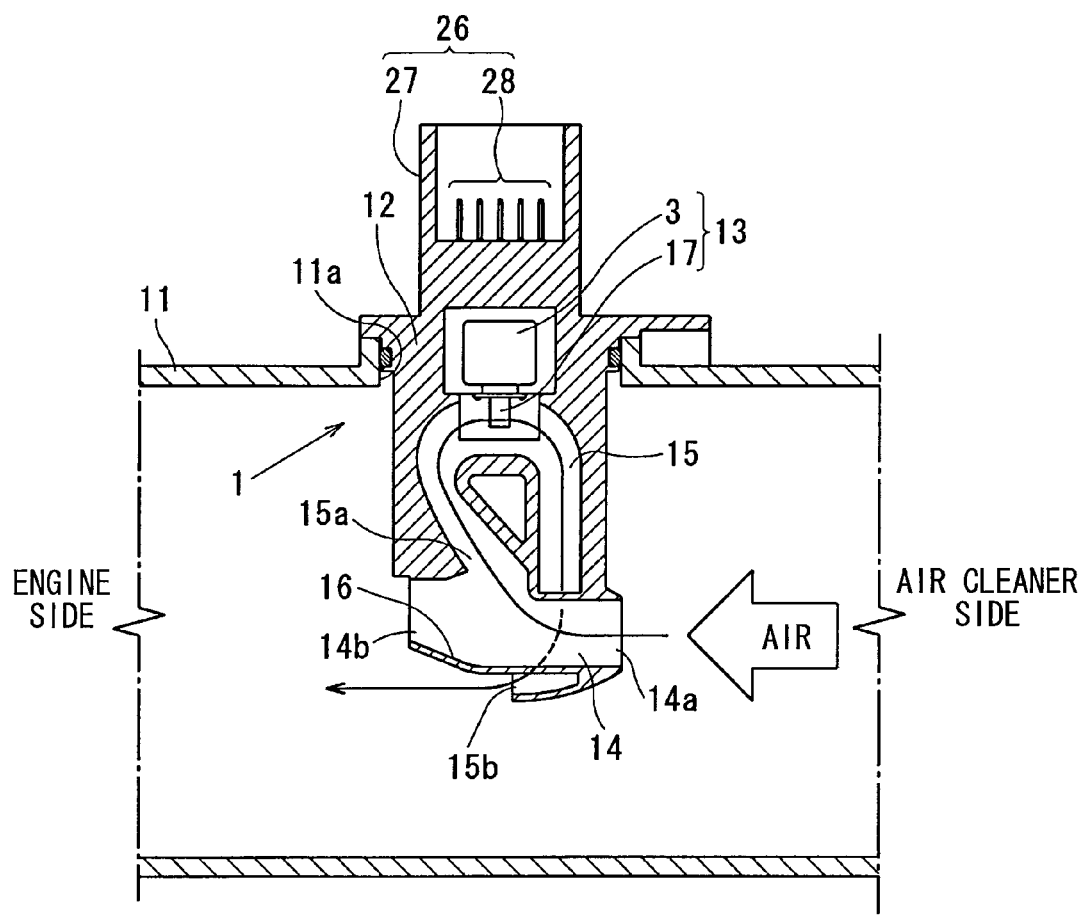
FIG. 1 is a sectional view roughly illustrating an air flow measuring device in accordance with a first embodiment.

A first embodiment will be described in reference to FIGS. 1 to 6. As illustrated in FIG. 1, the air flow measuring device 1 is disposed in an air intake duct 11 of an engine for vehicle traveling. The device 1 is a thermal-type air flow meter that measures a flow rate of air suctioned into the engine (intake air amount).

The air flow measuring device 1 includes a passage forming member (housing) 12 attached to the air intake duct 11 and a sensor assay 13 attached to this passage forming member 12.

The passage forming member 12 will be described below. The passage forming member 12 is formed from, for instance, resin material, and is attached to the air intake duct 11, which guides intake air to the engine. A bypass passage 14 and a sub-bypass passage 15, through which a part of intake air flowing through an inside (main passage) of the air intake duct 11 passes, are formed in the passage forming member 12. Specifically, an AFM insertion hole 11a passing through the duct 11 is provided for the air intake duct 11. By inserting and arranging the passage forming member 12 in the air intake duct 11 from the outside of this AFM insertion hole 11a, the air flow measuring device 1 is attached to the air intake duct 11.

As a result of the arrangement of the air flow measuring device 1 to the air intake duct 11, an air inlet 14a (air inlet of the bypass passage 14) formed on the passage forming member 12 is arranged toward an upstream side (air-cleaner side) in the intake air flow direction, and an air outlet 14b (air outlet of the bypass passage 14) formed on the passage forming member 12 is arranged toward a downstream side (engine side) in the intake air flow direction. The passage forming member 12 is detachably attached to the air intake duct 11 via a fastening member (not shown) such as a screw.

The bypass passage 14 is an air passage, and a part of air flowing through the inside of the air intake duct 11 passes through this air passage. The passage 14 is formed to be along the flow direction of intake air through the air intake duct 11. The above-described air inlet 14a is provided on the upstream side of the bypass passage 14 in the intake air flow direction, and the above-described air outlet 14b is provided on the downstream side of the bypass passage 14 in the intake air flow direction. An outlet throttle 16 for reducing a flow of air passing through the bypass passage 14 is provided for the air outlet 14b.

The sub-bypass passage 15 includes an inlet 15a and an outlet 15b for returning an airflow which has passed through the sub-bypass passage 15 into the air intake duct 11. A part of an airflow through the bypass passage 14 which has been reduced by the outlet throttle 16 flows into the inlet 15a. The passage 15 is configured as a bypass that rotates the air, which has flowed in through the inlet 15a, in the passage forming member 12 to return the air into the air intake duct 11. In this embodiment, it is illustrated that the outlet 15b of the sub-bypass passage 15 is independently provided. However, the outlet 15b is not limited to this. For example, the outlet 15b may open into the bypass passage 14 to return the airflow, which has passed through the sub-bypass passage 15, into the bypass passage 14 again.

The sensor assay 13 will be described below. As illustrated in FIG. 1, the sensor assay 13 includes a sensor portion 17 disposed in a region of the passage 15 with which the intake air flowing through the sub-bypass passage 15 is in contact, and the sensor circuit 3 disposed in the passage forming member 12.

Figure 3:
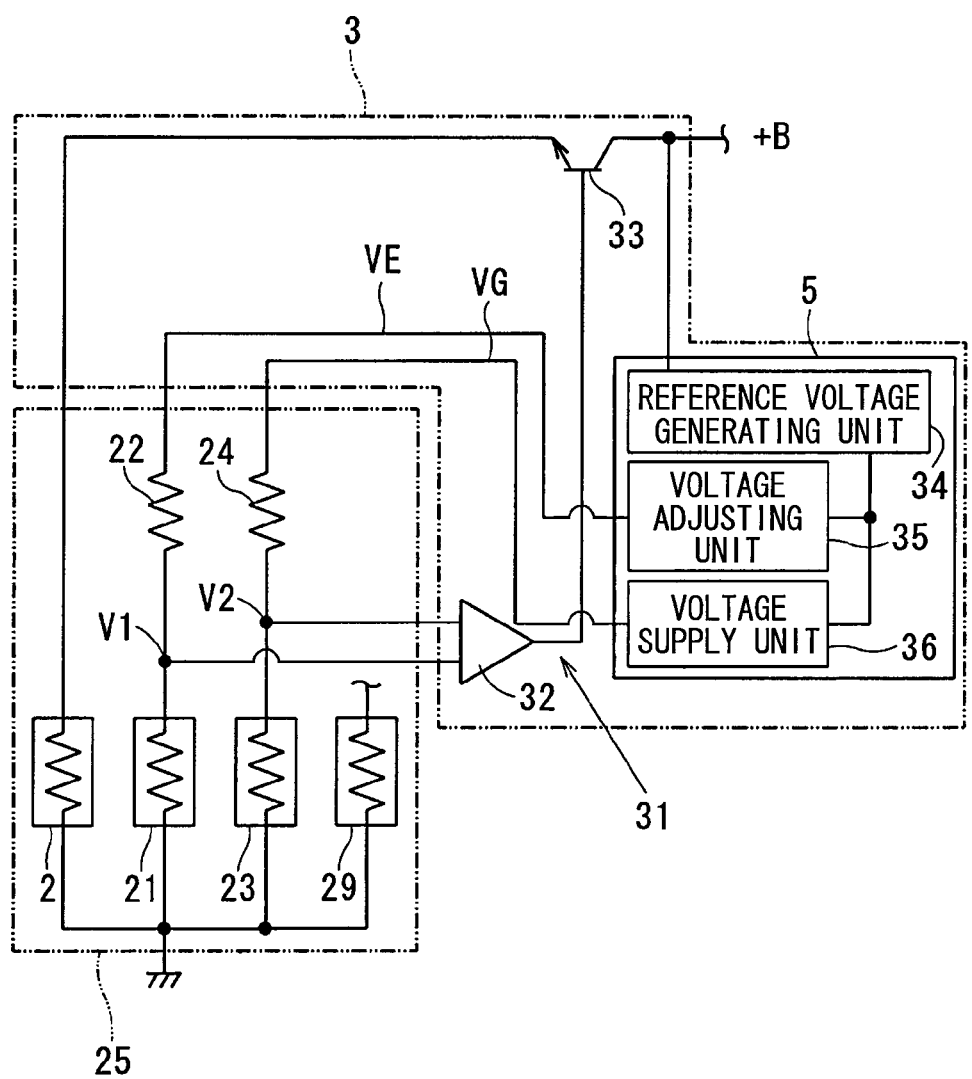
FIG. 3 is a diagram illustrating an electric circuit disposed in the air flow measuring device of the first embodiment.

As illustrated in FIG. 3, the heat generation heater 2 which heats the air passing through the sub-bypass passage 15 by means of its heat generation upon energization of the heater 2, a heated intake air temperature detection resistor 21 that detects temperature of intake air heated by the heat generation heater 2 (heated intake air temperature), a heating-side divider resistor 22 that is connected in series with this heated intake air temperature detection resistor 21 to generate a divided voltage value V1 that is in accordance with the heated intake air temperature, a non-heated intake air temperature detection resistor 23 that detects temperature of intake air which is not heated by the heat generation heater 2 (non-heated intake air temperature), and a non-heating side divider resistor 24 that is connected in series with this non-heated intake air temperature detection resistor 23 to generate a divided voltage value V2 that is in accordance with the non-heated intake air temperature, are provided for the sensor portion 17.

An intake air temperature detection resistor 29 that detects the temperature of intake air which is not heated by the heat generation heater 2 is provided for the sensor portion 17. This intake air temperature detection resistor 29 is a resistor independent of the non-heated intake air temperature detection resistor 23, and is disposed on a sensor board 25 (described in greater detail hereinafter) similar to the non-heated intake air temperature detection resistor 23 and so forth.

The sensor portion 17 of this embodiment employs a chip-type (board-type). The heat generation heater 2, the heated intake air temperature detection resistor 21, the heating-side divider resistor 22, the non-heated intake air temperature detection resistor 23, the non-heating side divider resistor 24, and the intake air temperature detection resistor 29, which have been described above, are arranged on the same (one) sensor board 25. In this embodiment, it is illustrated that the chip-type is used for a concrete example of the sensor portion 17. Alternatively, the sensor portion 17 is not limited to this. For example, the sensor portion 17 using a bobbin-type resistor (single article type resistor) may be employed.

Figure 2:
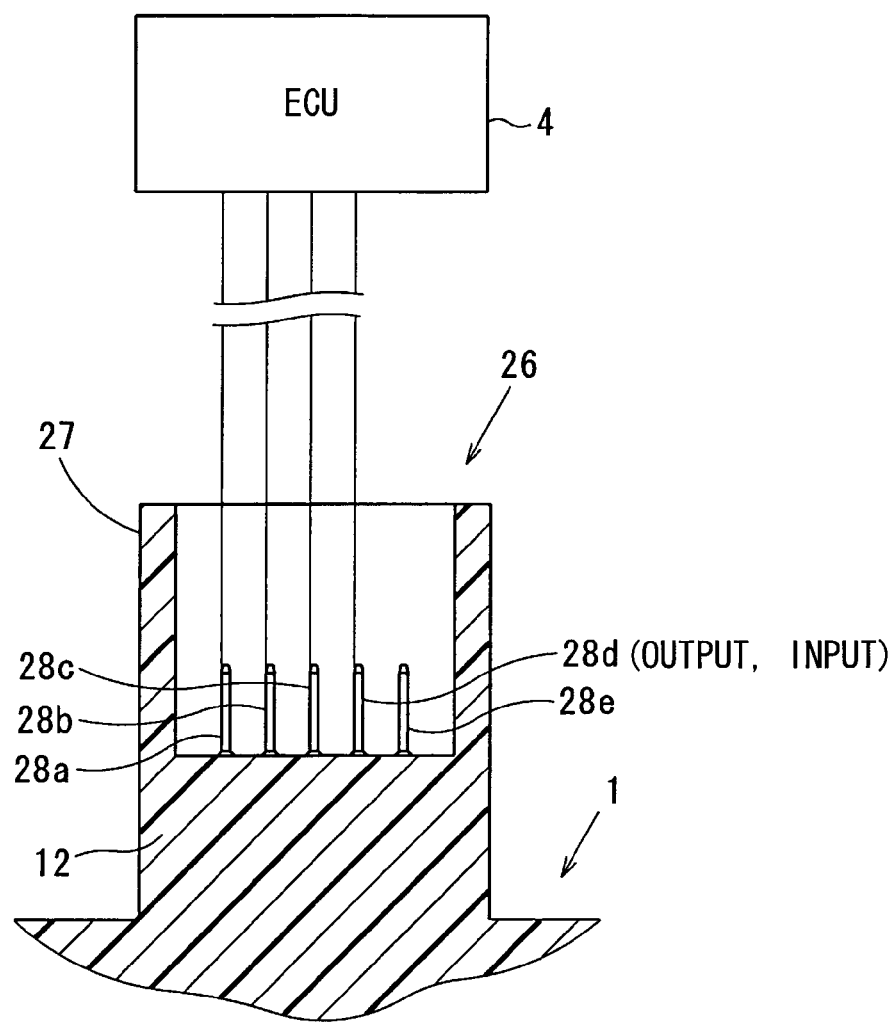
FIG. 2 is a diagram illustrating a state of a connection between a connector and an ECU of the air flow measuring device of the first embodiment.

As illustrated in FIG. 2, the sensor circuit 3 is electrically connected to the ECU 4 disposed in a region of the vehicle that is different from the air flow measuring device 1 through a connector 26 formed on the passage forming member 12. Specifically, the connector 26 is configured from a resin coupler 27 and terminals 28.

Although the configuration of the connector 26 is not limited, a specific example of the connector 26 will be described in reference to FIG. 2. The connector 26 illustrated in FIG. 2 is a "male connector", and includes the coupler 27 formed in a female shape and the terminals 28 held in a state to project into the coupler 27 on a bottom part of this coupler 27.

The coupler 27 in FIG. 2 is formed from resin by a part of the passage forming member 12. Specific details of the terminals 28 will be described below. From left to right in FIG. 2, an intake temperature terminal 28a that outputs a detection signal that is in accordance with the intake air temperature to the ECU 4, a power supply terminal 28b to which electric power (e.g., DC 5V) is supplied from the ECU 4, a ground terminal 28c connected to a ground of the ECU 4, an output terminal 28d that outputs a detection signal that is in accordance with the detected air flow rate to the ECU 4, and a circuit adjustment terminal 28e used for adjustment of the sensor circuit 3, are provided on the bottom part of the coupler 27 of this embodiment.

A housing (housing of the sensor assay 13) that accommodates the sensor circuit 3 is formed from, for example, a resin member, similar to the passage forming member 12. As a result of its attachment to the passage forming member 12, the sensor portion 17 is disposed in a U-turn portion of the sub-bypass passage 15. The sensor assay 13 may be bonded to the passage forming member 12 through an adhesive, welding technology or the like, or the sensor assay 13 may be detachably attached to the passage forming member 12 through a fastening member such as a screw.

A temperature difference maintenance unit 31 will be described below. The temperature difference maintenance unit 31, which performs energization control of the heat generation heater 2 such that a detected temperature difference between the heated intake air temperature detected by the heated intake air temperature detection resistor 21 and the non-heated intake air temperature detected by the non-heated intake air temperature detection resistor 23 becomes a preset constant temperature difference, is provided for the sensor circuit 3.

As illustrated in FIG. 3, this temperature difference maintenance unit 31 performs energization control on the heat generation heater 2 by means of a bridge circuit constituted of the heated intake air temperature detection resistor 21, the heating-side divider resistor 22, the non-heated intake air temperature detection resistor 23, and the non-heating side divider resistor 24 in the sensor portion 17. The unit 31 uses an operational amplifier (comparator) 32 which produces an output according to a voltage difference between the "divided voltage value V1 that is in accordance with the heated intake air temperature" obtained by a divided voltage between the heated intake air temperature detection resistor 21 and the heating-side divider resistor 22, and the "divided voltage value V2 that is in accordance with the non-heated intake air temperature" obtained by a divided voltage between the non-heated intake air temperature detection resistor 23 and the non-heating side divider resistor 24; and a power transistor (amplifying element) 33 that applies an electric current according to the output of this operational amplifier 32 to the heat generation heater 2.

Specifically, the temperature difference maintenance unit 31 carries out energization control of the heat generation heater 2 by the operational amplifier 32 and the power transistor 33 such that a detected temperature difference between the heated intake air temperature detected using the heated intake air temperature detection resistor 21 (divided voltage value V1) and the non-heated intake air temperature detected using the non-heated intake air temperature detection resistor 23 (divided voltage value V2) reaches a preset constant temperature difference (fixed voltage difference). In addition, at the time of normal control (at the time of flow measurement), the air flow rate is measured by the electric current value (value that varies according to the air flow rate) applied to the heat generation heater 2. As a specific example, the sensor circuit 3 of this embodiment generates a pulse width that is in accordance with the detected air flow rate (pulse frequency: for example, pulse frequency becomes higher as the air flow rate increases) in the output terminal 28d. The ECU 4 reads the air flow rate from the pulse width (pulse frequency) produced in the output terminal 28d.

The heat cleaning device 5 will be described below. The heat cleaning device 5 that makes higher the temperature of the heat generation heater 2 than a temperature at the time of normal control (at the time of measurement of the air flow rate) when an external signal (signal that provides a direction to start the heat cleaning) is inputted from the ECU 4 disposed outside the air flow measuring device 1, is provided for the sensor circuit 3.

The ECU 4 will be described below. The ECU 4 performs fuel injection control based on the air flow rate detected by the air flow measuring device 1 and engine operating state (e.g., engine rotational speed or engine load) detected by other sensors. The ECU 4 of this embodiment is configured to output the external signal (signal that provides a direction to start the heat cleaning) to the air flow measuring device 1 when the engine operational state satisfies a preset condition.

A specific example of the time that the ECU 4 outputs the external signal to the air flow measuring device 1 is when the ECU 4 determines that the flow measurement value has changed due to a stain as well as in such an operational state as not to influence air fuel ratio control of the engine; when an ignition switch is turned on (when the ECU 4 is turned on); at the time of engine cranking (when a starting switch is turned on); at the time of deceleration of the engine (at the time of fuel cut due to the deceleration); or when the ignition switch is turned off (when the ECU 4 is turned off).

The air flow measuring device 1 of this embodiment is configured such that the external signal (signal that provides a direction to start the heat cleaning) is given from the ECU 4 to any one of the intake temperature terminal 28a, the power supply terminal 28b, the ground terminal 28c, and the output terminal 28d among the above-described terminals 28. As a specific example, in this embodiment, the device 1 is configured such that the external signal is inputted into the output terminal 28d.

A concrete example of the external signal inputted into the output terminal 28d, and a concrete example of detection of the external signal inputted into the output terminal 28d by the sensor circuit 3 will be explained below. The sensor circuit 3 generates the pulse signal according to the detected air flow rate in the output terminal 28d as described above at the time of normal control (at the time of flow measurement). The specific pulse signal is generated by turning on and off (ungrounded and grounded relative to the earth) a voltage signal given to the sensor circuit 3 from the ECU 4 through the output terminal 28d by a switching element mounted on the sensor circuit 3. The external signal in this embodiment is switching of a supply voltage given from the ECU 4 into "0 V". Therefore, "an output signal is inputted into the output terminal 28d" means that "a supply voltage of the output terminal 28d becomes 0 V".

An external signal detection unit that detects that "the voltage of the output terminal 28d has reached 0V (i.e., that the external signal has been inputted into the output terminal 28d) is provided for the sensor circuit 3. This external signal detection unit detects the transmission of the external signal (signal that provides a direction to start the heat cleaning) from the ECU 4 when the supply voltage from the ECU 4 to the output terminal 28d is switched into "0 V" longer than a preset period.

The heat cleaning device 5 is configured to make higher the temperature of the heat generation heater 2 than the temperature at the time of normal control (at the time of measurement of the air flow rate) at the time of detection of the transmission of the external signal (signal that provides a direction to start the heat cleaning) from the ECU 4 by the above external signal detection unit. When making higher the temperature of the heat generation heater 2 than the temperature at the time of measurement of the air flow rate, the heat cleaning device 5 of this embodiment increases the temperature of the heat generation heater 2 to a heat cleaning temperature (310° C. as an example for helping understand the description) that is set to be higher than the temperature at the time of measurement of the air flow rate (temperature control of the heat generation heater 2 at the time of normal control: see a short dashes line A in FIG. 4B) based on the intake air temperature detected by the intake air temperature detection resistor 29.

Technology for increasing the temperature of the heat generation heater 2 will be described. More specifically, a technique for the temperature increase of the heat generation heater 2 at the time of heat cleaning will be explained below. The heat cleaning device 5 of this embodiment changes one divided voltage value of the "divided voltage value V1 that is in accordance with the heated intake air temperature" detected by use of the heated intake air temperature detection resistor 21, and the "divided voltage value V2 that is in accordance with the non-heated intake air temperature" detected by use of the non-heated intake air temperature detection resistor 23, so as to make higher the temperature of the heat generation heater 2 than the temperature at the time of measurement of the air flow rate, thereby performing the heat cleaning.

Specifically, as illustrated in FIG. 3, a reference voltage generating unit 34 (voltage regulator) that makes the supply voltage (see +B in FIG. 3) supplied to the sensor circuit 3 from the ECU 4 via the power supply terminal 28b a fixed voltage; a voltage adjusting unit 35 that applies a voltage VE for generating the divided voltage value V1, which is in accordance with the heated intake air temperature, to the heating-side divider resistor 22 at the time of normal control (at the time of flow measurement) and that changes the voltage VE applied to the heating-side divider resistor 22 for the temperature increase of the heat generation heater 2 compared to the time of normal control (for changing the divided voltage value V1) at the time of heat cleaning; and a voltage supply unit 36 that applies a voltage VG for generating the divided voltage value V2, which is in accordance with the non-heated intake air temperature, to the non-heating side divider resistor 24 both at the time of normal control (at the time of flow measurement) and at the time of heat cleaning, are provided for the sensor circuit 3 of this embodiment.

A technique for increasing the temperature of the heat generation heater 2 to the heat cleaning temperature (e.g., 310° C.) based on the intake air temperature will be described below. At the time of implementation of heat cleaning, the voltage adjusting unit 35 subtracts a temperature increase of the heat generation heater 2 (VE_CTL_PWup) obtained using a primary linear approximate expression indicated by the following equation (1) (see an alternate long and short dash line B in FIG. 4A) from the temperature of the heat generation heater 2 (VE_CTL) at the time of normal control (at the time of flow measurement). Using this subtracted temperature (changed temperature), the unit 35 variably controls the voltage VE.

$$VE\_CTL\_PWup = (\text{intake air temperature}) \times (\text{gain}) + (\text{offset value}) \quad (1)$$

Figure 4A:
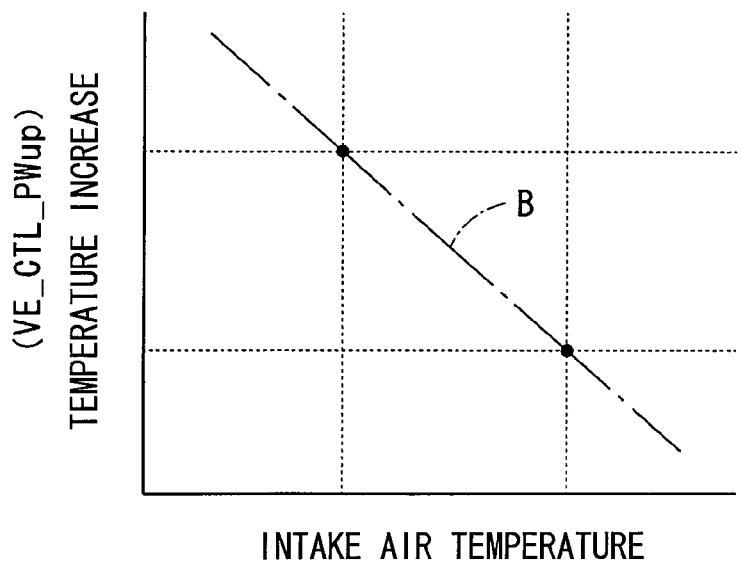
FIG. 4A is a graph illustrating a relationship between intake air temperature and temperature increase of a heat generation heater according to the first embodiment.
Figure 4B:
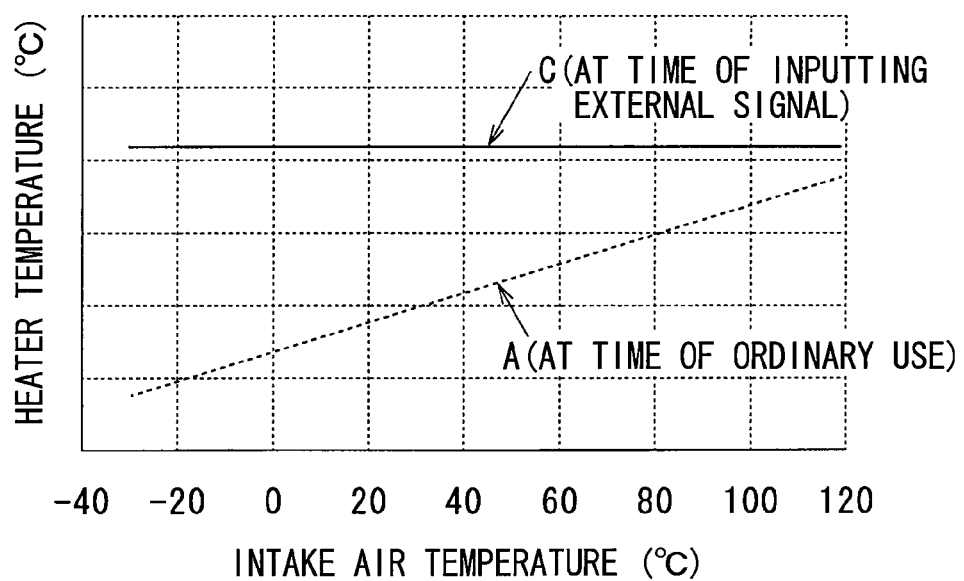
FIG. 4B is a graph illustrating a relationship between the intake air temperature and temperature of the heat generation heater according to the first embodiment.
Figure 5:
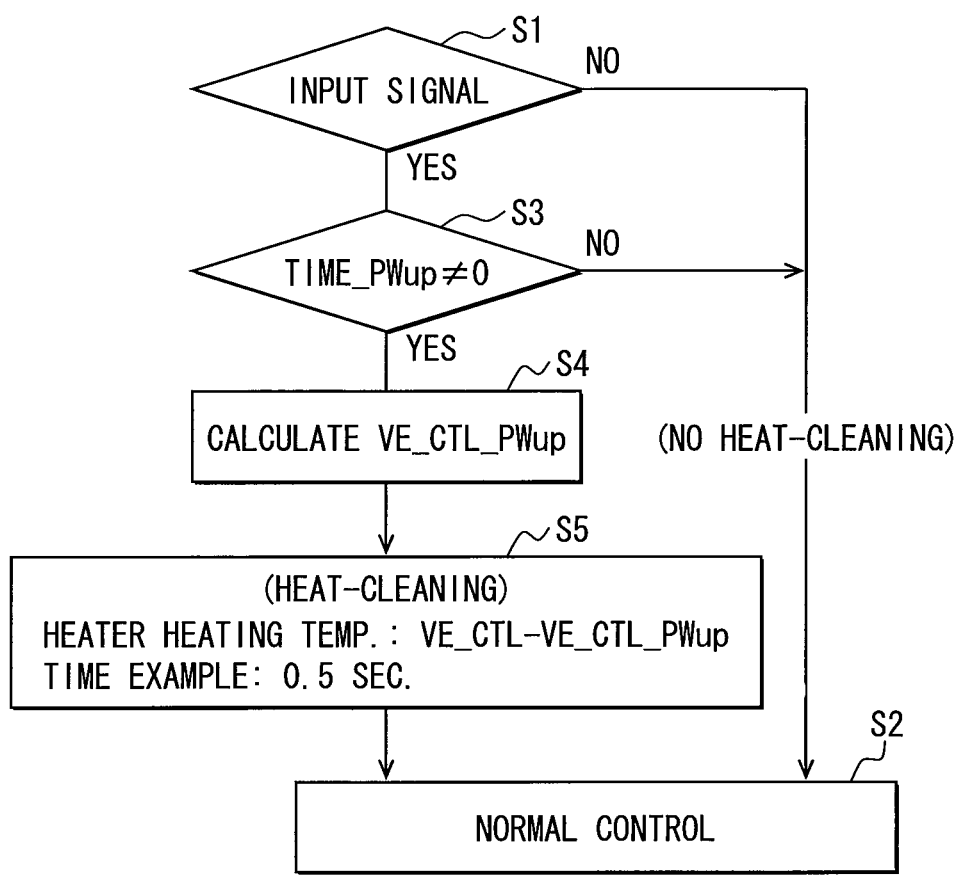
FIG. 5 is a flow chart showing an example of control of heat cleaning according to the first embodiment.
Figure 6:
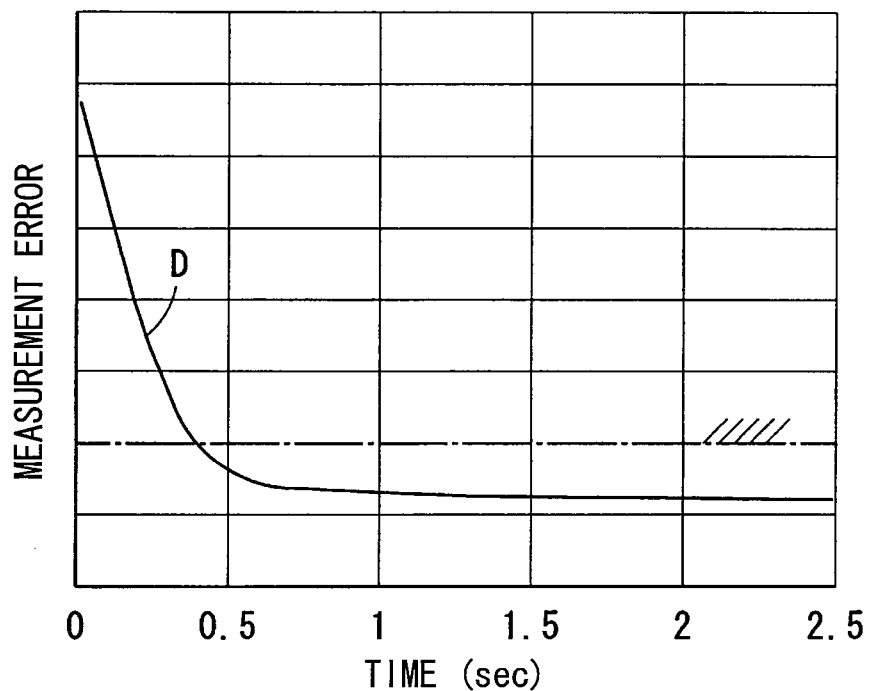
FIG. 6 is a graph illustrating a relationship between an energization time of the heat generation heater and a measurement error at time of implementation of the heat cleaning according to the first embodiment.

As described above, at the time of implementation of heat cleaning, the voltage adjusting unit 35 variably controls the voltage VE in accordance with the intake air temperature, so that so that as indicated by a continuous line C in FIG. 4B, even if the intake air temperature changes, the temperature of the heat generation heater 2 can be controlled to be a generally constant heat cleaning temperature (e.g., 310° C.)

An execution time of heat cleaning (period for the heat cleaning that makes higher the temperature of the heat generation heater 2 than the temperature at the time of measurement of the air flow rate) will be described below. A timer means (e.g., capacitor) for determining the heat cleaning period at the time of implementation of heat cleaning is provided for the voltage adjusting unit 35.

In this embodiment, in which the sensor portion 17 employs the chip-type, a setting range for the heat cleaning, period may be equal to or longer than 0.2 seconds and equal to or shorter than 2 seconds. Furthermore, the setting range for the heat cleaning period may be equal to or longer than 0.5 seconds and equal to or shorter than 1 second. As a specific example, it will be described below that the heat cleaning period is set at 0.5 seconds. Nevertheless, this is only a concrete example, and the heat cleaning period is not limited to 0.5 seconds.

The operation of heat cleaning will be described below. An example (operation) of control of the heat cleaning device 5 will be described with reference to a flow chart in FIG. 5. A device configured of a logic circuit or the like (without use of a microcomputer) may be used for the heat cleaning device 5. Or, a device executed through a control program using a microcomputer may be employed for the heat cleaning device 5.

First, it is determined whether the external signal has been inputted into the output terminal 28d from the ECU 4 (S1). If a determination result at this S1 is NO, the heat cleaning is not performed, and normal control (measurement of the air flow rate) is carried out (S2). If the above determination result at this S1 is YES, a determination whether the heat cleaning period is not set at 0 (zero) (determination on TIME_PWup≠0 in FIG. 5) is made (S3). If a determination result at this S3 is NO, the heat cleaning is not performed, and control proceeds to S2 (normal control) to measure the flow rate.

If the above determination result at this S3 is YES, the temperature increase of the heat generation heater 2 (VE_CTL_PWup) is calculated using the equation (1) (see S4). Next, the voltage VE is variably controlled (S5) (i) during a preset heat cleaning period (e.g., 0.5 seconds) (ii) using a temperature (changed temperature) as a result of subtracting the temperature increase of the heat generation heater 2 (VE_CTL_PWup), which is obtained at S4, from the temperature of the heat generation heater 2 (VE_CTL). Through this execution at S5, the heat cleaning whereby the temperature of the heat generation heater 2 is increased to the heat cleaning temperature (e.g., 310° C.) over the heat cleaning period (e.g., 0.5 seconds) is carried out. After this S5 is executed (after the heat cleaning period elapses), control proceeds to S2 (normal control) to measure the flow rate.

A first effect of the first embodiment will be described. The air flow measuring device 1 of the first embodiment performs the heat cleaning when the external signal is inputted into the air flow measuring device 1 from the ECU 4 as described above. Accordingly, the temperature of the heat generation heater 2 is made higher than the temperature at the time of measurement of the air flow rate. Therefore, when the heat cleaning is required by the ECU 4 (when the ECU 4 determines that the heat cleaning is necessary or when the ECU 4 determines that that the operational state is suitable for the heat cleaning), the air flow measuring device 1 of the first embodiment can perform the heat cleaning.

A second effect of the first embodiment will be described. In the air flow measuring device 1 of the first embodiment, as described above, the external signal is inputted into the output terminal 28d, and the output terminal 28d also serves as an input terminal of the external signal. For this reason, the "dedicated harness" and the "dedicated terminal" which are used in the conventional technology can be made unnecessary. As a result, the connector 26 can be downsized, and the cost of the air flow measuring device 1 can be limited.

A third effect of the first embodiment will be described. At the time of implementation of heat cleaning, the air flow measuring device 1 of this embodiment increases the temperature of the heat generation heater 2 to a generally constant heat cleaning temperature (e.g., 310° C.) based on the intake air temperature as described above. Accordingly, even though the heat cleaning is performed in a state of high intake air temperature, deterioration of the heat generation heater 2 due to an excessive temperature increase can be avoided. As a result, deterioration of accuracy in measurement of the air flow rate because of the deterioration of the heat generation heater 2 can be avoided. Thus, the reliable air flow measuring device 1 can be provided.

A fourth effect of the first embodiment will be described. When the external signal is inputted from the ECU 4, the air flow measuring device 1 of the first embodiment increases the temperature of the heat generation heater 2 to the preset heat cleaning temperature during the preset heat cleaning period as described above. Since the heat cleaning period is set by the air flow measuring device 1, the heat cleaning can be performed only through the generation of a simple output signal by the ECU 4. For this reason, a control load of the ECU 4 can be reduced.

A fifth effect of the first embodiment will be described. In the air flow measuring device 1 of this embodiment, as described above, the heat cleaning period is set in a range that is equal to or longer than 0.2 seconds and equal to or shorter than 2 seconds. By setting the heat cleaning period to be equal to or longer than 0.2 seconds, foreign substances can be efficiently removed through the heat generation of the heat generation heater 2. Accordingly, as indicated by a continuous line D in FIG. 6, the deterioration of accuracy in measurement of the air flow rate due to attachment of foreign substances can be avoided. By setting the heat cleaning period to be equal to or shorter than 2 seconds, an influence of the air flow rate measurement used for engine control (influence of the flow rate measurement after engine complete explosion) can be limited. Moreover, the deterioration of the heat generation heater 2 can be restrained.

In the air flow measuring device 1 of this embodiment, as described above, the heat cleaning period is set in the range that is equal to or longer than 0.5 seconds and equal to or shorter than 1 second. As indicated by the continuous line D in FIG. 6, by setting the heat cleaning period to be equal to or longer than 0.5 seconds, the removal of foreign substances by the heat generation of the heat generation heater 2 can be reliably performed. Accordingly, the deterioration of accuracy in measurement of the air flow rate due to attachment of foreign substances can be reliably avoided. By setting the heat cleaning period to be equal to or shorter than 1 second, the influence of the air flow rate measurement used for engine control can be more reliably limited. Moreover, the deterioration of the heat generation heater 2 can be restrained.

Furthermore, in the air flow measuring device 1 of this embodiment, as described above, the heat cleaning period is set at 0.5 seconds. By setting the heat cleaning period at 0.5 seconds, an effect of increasing a ratio of removal of foreign substances by the heat generation of the heat generation heater 2, and an effect of further reducing the influence of the air flow rate measurement used for engine control can be made compatible.

A sixth effect of the first embodiment will be described. In the air flow measuring device 1 of this embodiment, as described above, the intake air temperature detection resistor 29 is provided on the sensor board 25 on which the heat generation heater 2 and so forth are arranged. By providing the intake air temperature detection resistor 29 on the sensor board 25 on which the heat generation heater 2 and so forth are arranged, the cost for addition of the intake air temperature detection resistor 29 can be limited. Accordingly, a cost rise of the air flow measuring device 1 can be limited.

A seventh effect of the first embodiment will be described. In the air flow measuring device 1 of this embodiment, as described above, a bridge balance constituted of the heated intake air temperature detection resistor 21 and the non-heated intake air temperature detection resistor 23 is changed, so that the temperature of the heat generation heater 2 is increased. Specifically, by changing the "divided voltage value V1 that is in accordance with the heated intake air temperature (voltage VE for changing the divided voltage value V1)" detected by the heated intake air temperature detection resistor 21, the heat cleaning is carried out. For this reason, a special circuit for performing the heat cleaning does not need to be used. Accordingly, the cost of the air flow measuring device 1 which performs the heat cleaning can be limited.

Second Embodiment

Figure 7:
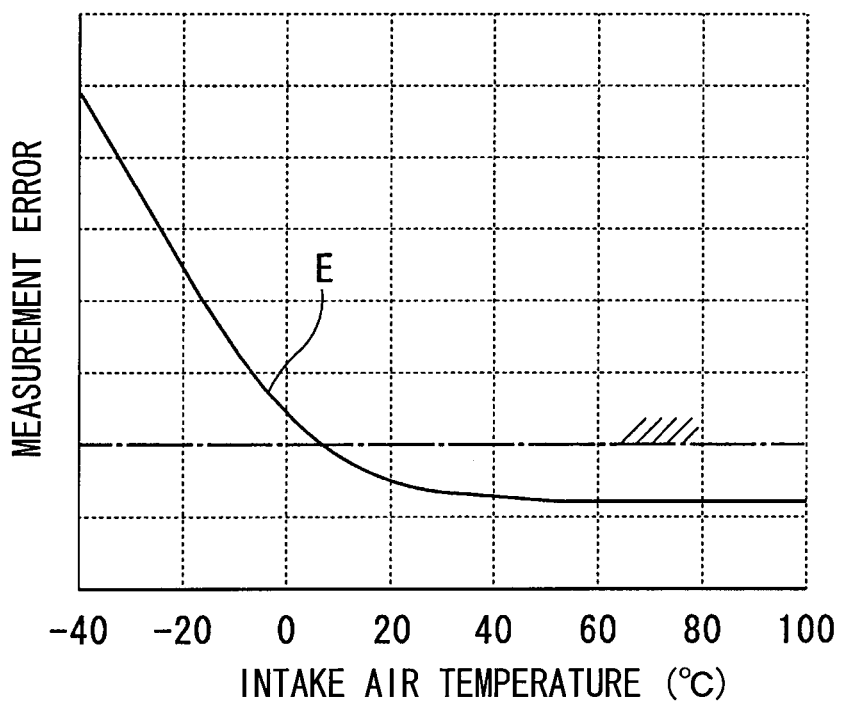
FIG. 7 is a graph illustrating a relationship between intake air temperature and a measurement error in accordance with a second embodiment.

A second embodiment will be described with reference to FIG. 7. In the following embodiment, the same numeral as in the above first embodiment indicates its corresponding functional component. According to an air flow measuring device 1 of this second embodiment, intake air temperature detected by an intake air temperature detection resistor 29 is added to an operation condition for heat cleaning. (i) When an external signal is inputted from an ECU 4, and (ii) when the intake air temperature detected by the intake air temperature detection resistor 29 is equal to or lower than a preset heat cleaning starting temperature (for example, when intake air temperature is equal to or lower than 20° C.), the heat cleaning is carried out.

A first effect of the second embodiment will be described. The air flow measuring device 1 of the second embodiment does not carry out the heat cleaning unless the intake air temperature is the heat cleaning starting temperature or lower (e.g., 20° C. or lower) as described above. Because the heat cleaning is not performed in a state of high intake air temperature (temperature higher than 20° C.), deterioration of a heat generation heater 2 due to an excessive temperature increase can be avoided. Accordingly, deterioration of accuracy in measurement of the air flow rate because of the deterioration of the heat generation heater 2 can be avoided. Thus, reliability of the air flow measuring device 1 can be improved.

A second effect of the second embodiment will be described. In the air flow measuring device 1 of the second embodiment, as described above, the heat cleaning starting temperature is set at 20° C. or lower. As indicated by a continuous line E in FIG. 7, when the intake air temperature is higher than 20° C., foreign substances are removed by heat generation of the heat generation heater 2 through normal control (energization control at the time of measurement of the air flow rate) without performing the heat cleaning. Accordingly, the deterioration of accuracy in measurement of the air flow rate due to attachment of foreign substances can be avoided.

Third Embodiment

In the above first embodiment, it is illustrated that, when the external signal is inputted into the air flow measuring device 1 from the ECU 4, the heat cleaning is performed during the preset heat cleaning period. In comparison, in this third embodiment, while an external signal is inputted into an air flow measuring device 1 from an ECU 4, heat cleaning is performed. Accordingly, a heat cleaning period can be arbitrarily controlled by the ECU 4, so that heat cleaning as required by the ECU 4 can be performed.

Industrial applicability of the air flow measuring device 1 will be described. In the above first embodiment, it is illustrated that the heat cleaning period is set to be constant (fixed). Alternatively, the heat cleaning period may be changed continuously or by stages according to an "operating condition such as intake air temperature".

The values (e.g., 310° C. of heat cleaning temperature) indicated in the above embodiments are only examples for helping understand the description. Needless to say, the heat cleaning temperature and so forth are not limited to these values.

In the above embodiments, it is illustrated that the intake air temperature detection resistor 29 and the non-heated intake air temperature detection resistor 23 are independently provided. Alternatively, they may be commonalized.

In the above embodiments, it is illustrated that the present disclosure is applied to the air flow measuring device 1, in which the two air passages (the bypass passage 14 and the sub-bypass passage 15) are formed in the passage forming member 12. Alternatively, the present disclosure may be applied to the air flow measuring device 1, in which only one air passage (intake air amount measurement passage) is formed inside the passage forming member 12.

In the above-described embodiments, it is illustrated that a flow direction of measured air passing by the sensor portion 17 is in the opposite direction from a flow direction of air which flows through the air intake duct 11. However, the flow direction of measured air passing by the sensor portion 17 is not limited. For example, a forward direction along the flow direction of air flowing through the air intake duct 11, or a direction perpendicular to the flow direction of air flowing through the air intake duct 11 may be employed.

To sum up, the air flow measuring device 1 of the above embodiments can be described as follows.

According to the air flow measuring device 1 of the first aspect, when the external signal is inputted from the outside of the air flow measuring device 1, the temperature of the heat generation heater 2 is made higher than the temperature at the time of measurement of the air flow rate. Accordingly, when the heat cleaning is required from the outside (such as when the flow measurement value has changed due to a stain, when the ignition switch is turned on, at the time of deceleration, or when the ignition switch is turned off), the heat cleaning can be performed.

According to the air flow measuring device 1 of the second aspect, the external signal is inputted into the output terminal 28d (terminal that outputs the detection signal that is in accordance with the air flow rate to the outside). Accordingly, since the output terminal 28d also serves as an input terminal of the external signal, the "dedicated harness" and the "dedicated terminal" which are used in the conventional technology can be made unnecessary.

According to the air flow measuring device 1 of the third aspect, the external signal is inputted into any one of the power supply terminal 28b, the ground terminal 28c, and the intake temperature terminal 28a. Accordingly, because "any one of the power supply terminal 28b, the ground terminal 28c, and the intake temperature terminal 28a" functions also as an input terminal for the external signal, the "dedicated harness" and the "dedicated terminal" which are used in the conventional technology can be made unnecessary.

According to the air flow measuring device 1 of the fourth aspect, while the external signal is inputted, the temperature of the heat generation heater 2 is increased to the preset heat cleaning temperature. Accordingly, the execution time of heat cleaning (hereinafter referred to as the heat cleaning period) can be arbitrarily controlled from the outside of the air flow measuring device 1.

According to the air flow measuring device 1 of the fifth aspect, when the external signal is inputted, the temperature of the heat generation heater 2 is increased to the preset heat cleaning temperature during the preset heat cleaning period.

The heat cleaning period of the sixth aspect is 0.2 seconds or longer, and 2 seconds or shorter. By setting the heat cleaning period to be 0.2 seconds or longer, the removal of foreign substances by heat generation of the heat generation heater 2 is carried out, and the deterioration of accuracy in measurement of the air flow rate due to attachment of foreign substances can be avoided. By setting the heat cleaning period to be 2 seconds or shorter, the influence of the air flow rate measurement used for engine control can be limited.

According to the air flow measuring device 1 of the seventh aspect, at the time of implementation of heat cleaning, the temperature of the heat generation heater 2 is increased based on the intake air temperature. Accordingly, even though the heat cleaning is performed in a state of high intake air temperature, deterioration of the heat generation heater 2 due to an excessive temperature increase can be avoided. As a result, deterioration of accuracy in measurement of the air flow rate because of the deterioration of the heat generation heater 2 can be avoided.

The intake air temperature detection resistor 29 of the eighth aspect is disposed on the sensor board 25, on which the heat generation heater 2 is provided. Accordingly, by providing the intake air temperature detection resistor 29 on the sensor board 25 on which the heat generation heater 2 is arranged, the costs can be curbed.

According to the air flow measuring device 1 of the ninth aspect, the energization of the heat generation heater 2 is controlled, such that the "detected temperature difference" between the heated intake air temperature detected by the heated intake air temperature detection resistor 21, and the non-heated intake air temperature detected by the non-heated intake air temperature detection resistor 23 becomes a preset constant temperature difference. Accordingly, at the time of flow measurement, the air flow rate can be measured by the electric current value (value that varies according to the air flow rate) applied to the heat generation heater 2.

According to the air flow measuring device 1 of the tenth aspect, a bridge balance constituted of the heated intake air temperature detection resistor 21 and the non-heated intake air temperature detection resistor 23 is changed, so that the temperature of the heat generation heater 2 is increased. Accordingly, because the heat cleaning is carried out by changing the bridge balance used for flow measurement, a special circuit for performing the heat cleaning is made unnecessary, and the costs can be curbed.

According to the air flow measuring device 1 of the eleventh aspect, by changing one voltage of the voltage VE applied to the heated intake air temperature detection resistor 21, and the voltage VG applied to the non-heated intake air temperature detection resistor 23, the temperature of the heat generation heater 2 is increased. Accordingly, by changing the "voltage" used for the flow measurement, the heat cleaning can be carried out. As a result, a special circuit for performing the heat cleaning is made unnecessary, and the costs can be curbed.

The air flow measuring device 1 of the twelfth aspect includes the bypass passage 14 (sub-passage with respect to the air intake duct 11) through which a part of intake air flowing inside the air intake duct 11 that guides intake air to the engine passes, and the sub-bypass passage 15 (secondary sub-passage with respect to the intake passage) through which a part of the intake air guided to this bypass passage 14 passes, to measure the amount of intake air passing through the sub-bypass passage 15.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A thermal thermal-type air flow measuring device for measuring a flow rate of air, the device comprising:
    a heat generation heater that is configured to heat a part of intake air drawn into an engine by heat generation upon energization of the heat generation heater;
    a sensor circuit that is configured to at least control the energization of the heat generation heater and to make temperature of the heat generation heater higher than temperature of the heat generation heater at time of the measurement of the flow rate of air when an external signal is inputted into the sensor circuit from outside of the device; and
    an intake air temperature detection resistor that is configured to detect temperature of intake air which is not heated by the heat generation heater, wherein the sensor circuit increases the temperature of the heat generation heater based on the temperature of intake air detected by the intake air temperature detection resistor.

2. The air flow measuring device according to claim 1, further comprising an output terminal that is configured to output a detection signal, which is in accordance with the flow rate of air, to the outside, wherein the external signal is inputted into the output terminal.

3. The air flow measuring device according to claim 1, further comprising:
    a power supply terminal to which electric power is supplied by the outside;
    a ground terminal that is grounded to an external earth; and
    an intake temperature terminal that is configured to output a detection signal, which is in accordance with temperature of intake air, to the outside, wherein the external signal is inputted into any one of the power supply terminal, the ground terminal, and the intake temperature terminal.

4. The air flow measuring device according to claim 1, wherein the sensor circuit increases the temperature of the heat generation heater to a preset heat cleaning temperature while the external signal is being inputted into the sensor circuit.

5. The air flow measuring device according to claim 1, wherein when the external signal is inputted into the sensor circuit, the sensor circuit increases the temperature of the heat generation heater to a preset heat cleaning temperature during a preset heat cleaning period.

6. The air flow measuring device according to claim 5, wherein the heat cleaning period is equal to or longer than 0.2 seconds and is equal to or shorter than 2 seconds.

7. The air flow measuring device according to claim 1, further comprising a sensor board on which the heat generation heater and the intake air temperature detection resistor are arranged.

8. The air flow measuring device according to claim 1, further comprising:
    a heated intake air temperature detection resistor that is configured to detect temperature of intake air which is heated by the heat generation heater; and
    the intake air temperature detection resistor that is configured to detect temperature of intake air which is not heated by the heat generation heater is a non-heated intake air temperature detection resistor, wherein the sensor circuit controls the energization of the heat generation heater such that a detected temperature difference between the temperature of intake air detected by the heated intake air temperature detection resistor, and the temperature of intake air detected by the non-heated intake air temperature detection resistor becomes a preset constant temperature difference.

9. The air flow measuring device according to claim 8, wherein the sensor circuit increases the temperature of the heat generation heater by changing a bridge balance including the heated intake air temperature detection resistor and the non-heated intake air temperature detection resistor.

10. The air flow measuring device according to claim 9, wherein the sensor circuit increases the temperature of the heat generation heater by changing one of a voltage applied to the heated intake air temperature detection resistor and a voltage applied to the non-heated intake air temperature detection resistor.

11. The air flow measuring device according to claim 1, wherein intake air is introduced into the engine through an air intake duct, the device further comprising:
    a bypass passage through which a part of intake air flowing in the air intake duct passes; and
    a sub-bypass passage through which a part of intake air guided into the bypass passage passes, wherein the device is configured to measure an amount of intake air passing through the sub-bypass passage.

* * * * *